US008150873B2

(12) United States Patent
Lee (10) Patent No.: US 8,150,873 B2
(45) Date of Patent: Apr. 3, 2012

(54) METHOD AND APPARATUS FOR FINDING MAXIMAL FREQUENT ITEMSETS OVER DATA STREAMS (75) Inventor: Wong Suk Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 599 days.

(21) Appl. No.: 12/258,645

(22) Filed: Oct. 27, 2008

(65) Prior Publication Data
US 2009/0112863 A1 Apr. 30, 2009

(30) Foreign Application Priority Data
Oct. 26, 2007 (KR) .................. 10-2007-0108074

(51) Int. Cl.
G06F 7/00 (2006.01)
(52) U.S. Cl. .................. 707/776; 707/797; 706/58
(58) Field of Classification Search .............. None
See application file for complete search history.

(56) References Cited

U.S. PATENT DOCUMENTS

| 2003/0217055 A1* | 11/2003 | Lee et al. ............ 707/6 |
| 2006/0149766 A1* | 7/2006 | Ghoting et al. ........ 707/101 |
| 2006/0174024 A1* | 8/2006 | Chi et al. ............ 709/231 |
| 2007/0198548 A1* | 8/2007 | Lee .................. 707/100 |
| 2009/0055332 A1* | 2/2009 | Lee .................. 706/12 |

OTHER PUBLICATIONS

Burdick, D., et al., "MAFIA: A Maximal Frequent Itemset Algorithm for Transactional Databases", ICDE 2001, Apr. 2001, pp. 443-452.*
Chang, J.H., et al., "Finding Recent Frequent Itemsets Adaptively over Online Data Stream," SIGKDD 2003, Aug. 2003, pp. 487-492.*
Grahne, G. et al., "Efficiently Using Prefix-trees in Mining Frequent Itemsets", FIMI 2003, Nov. 2003.*
Hafez, A. et al., "The Item-Set Tree: A Data structure for Data Mining", DaWaK 1999, Aug. 1999.*
Woo, H.J. et al., "estMax: Tracing maximal frequent itemsets over onine data streams", Seventh IEEE International Conference on Data Mining, Oct. 28, 2007, pp. 709-714.*
Daesu Lee and Wonsuk Lee, "Finding Maximal Frequent Itemsets over Online Data Streams Adaptively", ICDM Nov. 27-30, 2005.*

* cited by examiner

Primary Examiner — Vei-Chung Liang

(57) ABSTRACT

A method and apparatus to find maximal frequent itemsets over data streams. A prefix tree manages itemsets and appearance frequencies of the itemsets, and each of nodes of the prefix tree has information about an appearance frequency, a maximum lifetime, and a mark indicating whether the corresponding itemset is a maximal frequent itemset. The method includes: receiving transaction $T_k$ generated at a current point in time; updating the information owned by each node corresponding to the itemset of the transaction $T_k$ among the nodes of the prefix tree; adding each node that is not managed in the prefix tree among nodes corresponding to the itemset of the transaction $T_k$, to the prefix tree and setting the information on the added nodes; and finding maximal frequent itemsets by visiting each node of the prefix tree that has the mark indicating the maximal frequent itemset and checking whether the corresponding itemset is frequent.

13 Claims, 5 Drawing Sheets

METHOD AND APPARATUS FOR FINDING MAXIMAL FREQUENT ITEMSETS OVER DATA STREAMS

BACKGROUND OF THE INVENTION

1. Technical Field

The present invention relates to data mining that analyzes a large amount of data sets to find specific information, and more particularly, to a method and apparatus for finding maximal frequent itemsets over data streams configured of continuously generated transactions.

2. Related Art

In recent years, unlike existing database processing technology for processing limited data sets, a study on data stream processing technology for processing data streams has actively progressed. The data stream is defined as an infinite set consisting of continuously generated data. Therefore, it is impossible to separately store all the generated data objects in a limited space. Several conditions should be satisfied in order to extract knowledge on the information of the data stream in consideration of the above-mentioned features. First, the mining results should be generated by reading each transaction information only once. Second, no matter how infinitely new data is continuously generated in order to analyze the data streams, the new data should be able to be processed in a physically limited memory space. Third, the newly generated data objects should be processed as rapidly as possible so as to provide the results. In order to satisfy the above-mentioned requirements, the mining results generated by the mining methods for the data streams inevitably include minor errors.

Generally, the frequent items are found by selecting all the items having support larger than a specific support threshold in the limited data set. Since the method for finding the frequent items in the data stream environment is impossible to maintain all the previously generated transaction information, the frequent itemsets or the appearance frequency obtained from the mining results may include minor errors. In the data stream environment, a count sketch algorithm, which is one of the methods for finding frequent items, focuses on a support finding of unit items and estimates the appearance frequency of unit items in transactions generated up to a predetermined time to generate a set of unit items satisfying the threshold or more. On the other hand, a Lossy counting algorithm finds a set of frequent items equal to or more than the minimum support within an allowable error when the minimum support and the maximally allowable error are given. The transactions newly generated in the data streams is filled in a buffer having a predetermined size within the memory and are processed in one lump and manages the frequency of items, such as which are likely to be the frequent items, and the errors of each items. Since the Lossy counting algorithm can process many transactions newly generated when the size of the buffer becomes large, it reduces the number of batch operations, while relatively increasing the memory usage.

There are specialized algorithms for finding a closed frequent itemset and a maximal frequent itemset of the frequent itemsets. Chi et al. (U.S. Publication No. 2006/0174024 A1) proposed a MOMENT algorithm for mining the closed frequent itemsets in the data streams. The MOMENT algorithm uses a tree based structure, which is called a Closed Enumeration Tree (CET), within the memory, to validate transactions on a sliding window to manage the closed frequent itemsets appearing on the stream. A closed frequent itemset (CFI)-stream, which is an algorithm mining and finding the closed frequent itemsets in a similar manner to the MOMENT algorithm, slightly improves the memory usage and the consumed time over the MOMENT algorithm by using a simplified Direct Update (DIU) tree structure.

The maximal frequent itemsets indicate individual frequent items having the longest length among the frequent itemsets. In order words, if the support of the itemsets is equal to or more than a user minimum support and there is no frequent superset, the maximal frequent itemsets are called "maximal frequent". In the data stream environment, a method for finding maximal frequent itemsets may include a data stream mining for maximal frequent itemsets (DSM-MFI) algorithm. The DSM-MFI method proposes using an SFI-forest (Summary Frequent Itemset forest) that expands a prefix tree structure. The SFI-forest manages a list of the frequent itemsets configured to have a suffix tree structure in a landmark window that targets data from a specific point in time to a current point in time. Another method for finding the maximal frequent itemsets may include an INSTANT algorithm. The INSTANT algorithm uses an array structure so as to management the itemsets, unlike the methods in the related art that configures and updates a tree. The INSTANT algorithm stores all the itemsets for each frequency i appearing up to now in each array U[i] and if the frequency is updated, shifts the corresponding itemsets to other arrays, that is, U[i+1]. At this time, if other itemsets, which are a subset of the shifted itemsets, exist in the corresponding array, they are removed. Thereby, the itemsets having the longest length are stored in the array for each frequency. Among these array structures, the itemsets whose frequency is equal to or more than the minimum support outputs their results as the maximal frequent itemsets and are removed from the array. Since the INSTANT algorithm individually compares all of the itemsets and manages both the longest itemsets and the frequency, it is assured that the accurate results are output at any time. However, since all the itemsets should be maintained in the comparison process, the performance time and memory usage are excessively consumed. As a result, this INSTANT algorithm may be inappropriate for the data stream environment

SUMMARY OF THE INVENTION

The technical problem to be solved by the present invention is to provide a method and apparatus for finding maximal frequent itemsets capable of efficiently finding a maximal frequent itemsets while reducing performance time and memory usage using a prefix tree, in finding maximal frequent itemsets over data streams configured of continuously generated transactions.

In order to achieve the above-mentioned technical problems, there is provided a method for finding maximal frequent itemsets over data streams including continuously generated transactions, the method including: when the itemsets included in previously generated transactions and a frequency of the itemsets are managed by a prefix tree and each of the nodes of the prefix tree has information, such as the appearance frequency of the itemsets corresponding to the nodes in question, a maximum lifetime, which is a maximum point in time that may allow the itemsets to remain in a frequent state even when no itemset appears later, a mark indicating whether the itemsets are the maximal frequent itemsets, or the like, receiving transaction $T_k$ generated at a current point in time; updating the information owned by each node corresponding to the itemsets included in the transaction $T_k$ among the nodes of the prefix tree; adding each node corresponding to the itemsets, which are not managed in the prefix tree among the itemsets included in the transaction $T_k$, to the prefix tree and setting the information on the added nodes; and finding the maximal frequent itemsets by checking whether the corresponding itemsets are frequent while visiting ones of the nodes of the prefix tree that allows the mark to indicate the maximal frequent itemsets.

Step (b) may include trimming from the prefix tree ones of the nodes of the prefix tree whose support of the corresponding itemsets is smaller than significant support having a predetermined value.

In adding each node to the prefix tree, step (c) may estimate the appearance frequency of the itemsets and add the corresponding nodes to the prefix tree only when the support according to the estimated appearance frequency is equal to or larger than the significant support having a predetermined value.

In connection with the nodes corresponding to $T_k$-max, which is the maximal frequent itemsets satisfying partial itemsets of $T_k$, among the nodes, step (b) may allow the mark owned by the node corresponding to $T_k$-max to indicate the maximal frequent itemsets only when a maximum error generated in the process of estimating the support of $T_k$-max is within a maximum error threshold.

Determining whether the node or not corresponds to $T_k$-max may be determined by a node whose maximum lifetime is updated from before the current point in time k to after the current point in time k or a node not having children nodes corresponding to the itemsets whose support according to the appearance frequency is equal to or more than the minimum support having a predetermined value and appearing in the transaction $T_k$ is a node corresponds to $T_k$-max.

Step (b) may update the mark so as to indicate the maximal frequent itemsets only for the predetermined number of nodes in the order of length of the corresponding itemsets among the nodes corresponding to $T_k$-max.

Step (c) may include: (c1) regarding the transaction $\overline{T}_k$ generated by excluding the items having smaller support than the significant support among the items included in the $T_k$, estimating the appearance frequency of the itemsets, which are not managed in the prefix tree, among the itemsets included in $\overline{T}_k$ and adding the corresponding nodes to the prefix tree when the support according to the estimated appearance frequency is equal to or more than the significant support; and (c2) when the maximum error generated in the step (c1) of the itemsets corresponding to the added nodes is within the maximum error threshold having a predetermined value, setting the mark of the added nodes so as to indicate the maximal frequent itemsets and setting the maximum lifetime.

Step (c) may further include updating the mark so as not to indicate the maximal frequent itemsets in connection with the nodes corresponding to the partial itemsets of the itemsets corresponding to the nodes setting the mark so as to indicate the maximal frequent itemsets at step (c2) and updating the maximum lifetime.

In order to solve another technical problem, there is provided an apparatus for finding maximal frequent itemsets over data streams including continuously generated transactions, the apparatus including: a memory that stores a prefix tree so that the itemsets included in previously generated transactions and an appearance frequency of the itemsets are managed by a prefix tree and each of the nodes of the prefix tree has information, such as the appearance frequency of the itemsets corresponding to the nodes in question, a maximum lifetime, which is a maximum point in time that may allow the itemsets to remain in a frequent state even when no itemset appears later, a mark indicating whether the itemsets are the maximal frequent itemsets, or the like; an information updating unit that updates the information owned by each node corresponding to the itemsets included in the transaction $T_k$ generated in a current point in time among the nodes of the prefix tree; an information setting unit that adds each node corresponding to the itemsets, which are not managed in the prefix tree, among the itemsets included in $T_k$ and sets the information on the added nodes; and a maximal frequent itemsets finding unit that finds the maximal frequent itemsets by checking whether the corresponding itemsets are frequent while visiting ones of the nodes of the prefix tree that allows the mark to indicate the maximal frequent itemsets.

The information updating unit may trim from the prefix tree ones of the nodes of the prefix tree whose support of the corresponding itemsets is smaller than important support having a predetermined value.

The information setting unit may estimate the appearance frequency of the itemsets in adding each node to the prefix tree and add the corresponding node to the prefix tree only when support according to the estimated appearance frequency is equal to or more than significant support having a predetermined value.

The information updating unit may allow the mark owned by the node corresponding to $T_k$-max to indicate the maximal frequent itemsets only when a maximum error generated in the process of estimating the support of $T_k$-max is within a maximum error threshold, in connection with the nodes corresponding to $T_k$-max, which is the maximal frequent itemsets satisfying partial itemsets of $T_k$, among the nodes.

Determining whether the node or not corresponds to $T_k$-max in the information updating unit may be determined by a node whose maximum lifetime is updated from before the current point in time k to after the current point in time k or a node not having children nodes corresponding to the itemsets whose support according to the appearance frequency is equal to or more than the minimum support having a predetermined value and appearing in the transaction $T_k$ is a node corresponds to $T_k$-max.

The information updating unit may update the mark so as to indicate the maximal frequent itemsets only for the predetermined number of nodes in the order of length of the corresponding itemsets among the nodes corresponding to $T_k$-max.

The information setting unit may estimate the appearance frequency of the itemsets, which are not managed in the prefix tree, among the itemsets included in $\overline{T}_k$, in connection with the transaction $\overline{T}_k$ generated by excluding the items having smaller support than the significant support among the items included in the $T_k$, adding the corresponding nodes to the prefix tree when the support according to the estimated appearance frequency is equal to or more than the significant support, when the maximum error generated at the time of estimating the appearance frequency of the itemsets corresponding to the added nodes is within the maximum error threshold having a predetermined value, set the mark of the added nodes so as to indicate the maximal frequent itemsets, and set the maximum lifetime.

The information setting unit may update the mark so as not to indicate the maximal frequent itemsets in connection with the nodes corresponding to the partial itemsets of the itemsets corresponding to the nodes setting the mark so as to indicate the maximal frequent itemsets and updates the maximum lifetime.

In order to solve still another technical problem, there is provided a recording medium readable by a computer recording a program for running the method for finding maximal frequent itemsets over data streams configured of continuously generated transactions according to the present invention as described above.

According to the present invention, the prefix tree is used for finding the maximal frequent itemsets over the data streams configured of the continuously generated transactions, making it possible to efficiently find the maximal frequent itemsets while reducing the performance time and the memory usage.

DESCRIPTION OF THE PREFERRED EMBODIMENTS

Hereinafter, preferred embodiments of the present invention will be described with reference to the accompanying drawings. In the following description and accompanying drawings, substantially like components are denoted by like reference numerals in order to avoid duplicate descriptions thereof. Also, in describing the present invention, the detailed description of known functions and configurations will be omitted so as not to obscure the subject of the present invention with unnecessary detail.

First, symbols to be used are defined prior to describing the present invention.

A data stream is defined by an infinite set of continuously generated transactions as follows.

i) $I=\{i_1, i_2, \ldots i_n\}$ is a set of items up to now, wherein the item means unit information generated in an application domain.

ii) when $2^I$ indicates a power set of the itemsets I, e satisfying $e \in (2^I-\{\emptyset\})$ is referred to as a timeset and a length $|e|$ of a timeset means the number of timesets configuring the itemset e, wherein any timesets e is defined by $|e|$-itemsets according to the length of the corresponding itemsets. Generally, 3-timesets, that is, $\{a, b, c\}$ is indicated by abc in short.

iii) transactions are a partial set of I, not a null set, wherein each transaction has a transaction identifier TID. The transaction added to a data set in a $k^{th}$ order is indicated by $T_k$, wherein TID of $T_k$ is k.

iv) when new transaction $T_k$ is added, the current data set $D_k$ includes all the added transactions, that is, $D_k=<T_1, T_2, \ldots T_k>$ generated up to now. A total number of transactions included in the data set $D_k$ is indicated by $|D|_k$.

When $T_k$ refers to transactions generated at the current point in time k, a current appearance frequency in connection with a predetermined itemset e is defined by $C_k(e)$, which indicates the number of transactions including e at k transaction up to now. Similarly to the foregoing description, the current support $S_k(e)$ of the itemset e is defined by a ratio of the total number $|D|_k$ of transactions up to now to the appearance frequency $C_k(e)$ of the itemset e, that is, $C_k(e)/|D|_k$. When the current support $S_k(e)$ of the itemset e is equal to or larger than a previously defined minimum support $S_{min}$, the itemset e is defined by the frequent itemsets in the current data stream $D_k$. Further, when the support $S_k(e')$ of all the itemsets e', which are $e \subset e'$, among the frequent itemset e is less than $S_{min}$, the itemset e refers to the maximal frequent itemset in the current data stream $D_k$.

Next, as the basis of one embodiment of the present invention, an estDec method, which is a method for finding the frequent itemsets targeting the data stream, will be described.

The estDec method processes the transactions configuring the data streams immediately after the transactions are generated and manages the appearance frequency of the itemsets appearing in the transactions by using a monitoring tree having the prefix tree structure without generating a candidate set for generating the frequent itemsets. When the current data set $D_k$ is given, the prefix tree $P_k$ has the following characteristics.

i) $P_k$ has one root node r having a "null" value and other nodes other than r have one item $i \in I$.

ii) in connection with any nodes n having one item, when $i_n \in I$ of the given prefix tree $P_k$, nodes existing on a path from a root node to a node n has an order of $n_{root} \to n_1 \to n_2 \to \cdots \to n_v \to n$ and any node $n_j$ on the path has an item $i_j \in I$ ($1 \leq j \leq v$), the node n represents the timeset $e_n=i_1 i_2 \cdots i_n$ and manages the current appearance frequency $C_k(e_n)$ of $e_n$.

Further, the estDec method performs a delay addition and term trimming works so as to manage only the itemsets, which is likely to be the frequent itemsets, by using the prefix tree structure on the memory. In the estDec method, there are two cases where the itemsets appearing in the data streams $D_k$ should be managed in the prefix tree on the memory. First, the itemsets having 1 in length, which are first generated in a new transaction $T_k$, are added and managed by the prefix tree unconditionally. Second, when new items, which are not managed by the prefix tree, are generated in $T_k$, the corresponding itemsets are added to the prefix tree only when they have large support enough to be the frequent itemsets in a near future. In other words, in the new n-itemset e that is not managed by the prefix tree, the support of e is estimated from the appearance frequency of these (n−1)-partial itemsets when all the (n−1)-partial itemsets of the new n-itemset e are managed in the prefix tree and the new n-itemset e is added to the prefix tree when the estimated value is equal to or more than the previously defined significant support $S_{sig}$. This is referred to as the delay addition. In other words, the estimated appearance frequency of the n-itemset e is a minimum value $C_k^{min}(l_i)$ ($1 \leq i \leq n$) among the appearance frequency of all the (n−1)-partial itemsets $\{l_1, l_2, \ldots, l_n\}$. As a result, the maximal error $\epsilon(l_i)$ generated in the process of estimating the support of e is $(C_k^{max}(l_i)-C_k^{min}(l_i))$ and the error rate $s(l_i)$ is $(C_k^{max}(l_i)-C_k^{min}(l_i))/|D_k|$.

On the other hand, when the support of the current itemsets for the itemsets that are previously managed by the prefix tree is reduced to less than $S_{sig}$, the corresponding itemsets are considered as insignificant itemsets what means they are likely to be lower frequent itemsets later, such that the nodes representing the corresponding itemsets and all the children nodes of the corresponding itemsets are removed in the prefix tree. This is referred to as item trimming. The magnitude in the prefix tree for managing the appearance frequency can be reduced through these two operations (delay addition and item trimming).

Hereinafter, a method for finding the maximal frequent itemsets over the data streams according to the exemplary embodiment of the present invention will be described.

According to the one embodiment of the present invention, each node of the prefix tree manages information, such as maximum lifetime (hereinafter, referred to as ML), maximality mark (herinafter, referred to as IS_MAX), etc., as additional information so as to manage the maximal frequent itemsets in addition to the above-mentioned information, wherein the maximum lifetime, which is a maximum point in time, may allow the itemsets to remain in a frequent state even when no itemset appears later and the maximality mark indicates whether the itemsets are the maximal frequent itemsets or not. More specifically, they may be defined as follows.

i) Maximum Lifetime (ML)

The maximum lifetime $ML(e)$ of the frequent itemset e for the current data stream $D_k$ is the maximum point in time that may allow the itemset e to remain in the frequent state even when no itemset appears later.

On the other hand, the maximum lifetime has the following features according to the above-mentioned definition.

Feature 1: the maximum lifetime $ML(e)$ of the itemset e is $$\left\lfloor \frac{C_b(e)}{S_{mix}} \right\rfloor$$

regarding the minimum support $S_{min}$.

Feature 2: in connection with two itemsets $e_1$, $e_2$, if $e_1 \subseteq e_2$, then $ML_k(e1) \geq ML_k(e2)$.

ii) Maximality Mark (IS_MAX)

The maximality mark IS_MAX is a mark indicating whether the itemset e is the maximal frequent itemset in the current data stream $D_k$. In other words, if e is the maximal frequent itemset, it can be indicated by IS_MAX(e)=T or TRUE or if e is not the maximal frequent itemset, it can be indicated by IS_MAX(e)=F or FALSE.

Also, in one embodiment of the present invention, the following concept is introduced in order to more efficiently find the maximal frequent itemsets.

iii) Transactional maximal frequent itemsets. The maximal frequent itemsets satisfying $e \subset T_k$ in connection with itemset e of the current data stream $\overline{D_k}$ is referred to as the transactional maximal frequent itemsets. The transactional maximal frequent itemsets will be indicated by $T_k$-max.

iv) Top-L transactional maximal frequent itemsets When all the $T_k$-max found in the current data stream $D_k$ descends in the order of length, the $T_k$-max, which is included in the previously defined threshold L rankings, is referred to as the top-L transactional frequent itemsets.

When a new transaction $T_k$ is generated, it is $ML_{k-1}(e) > k$ in connection with the itemsets and if the new transaction $T_k$ is $IS\_MAX_{k-1}(e)=T$, it can be appreciated that e is the maximal frequent itemsets in the current data stream $D_k$. On the other hand, if any itemsets e are $T_k$-max and $ML_{k-1}(e) < k \leq ML_k(e)$, this itemset e becomes not the maximal frequent itemsets up to $T_{k-1}$, but becomes the new maximal frequent itemsets according to the appearance in the transaction $T_k$, such that it is updated into $IS\_MAX_k(e)=T$. A subset $e_p$ of the itemset e considered as the maximal frequent itemset is not considered as non-maximal frequent any more, such that the itemset e are updated to $IS\_MAX(e_p)=F$ in connection with all the subset $e_p$ and the value thereof is changed to $ML(e_p)=ML(e)$.

Hereinafter, a method capable of reducing errors when finding the maximal frequent itemset will be described.

In the method for finding the frequent itemsets using the prefix tree, the frequency $C_f(e)$ of the current itemset e is estimated using the frequency of all the subset of the itemset e so as to accurately find a new significant itemset e. When the estimated frequency of the itemset is equal to or more than the previously defined significant support $S_{sig}$, the corresponding itemset is added to the prefix tree as the significant itemset. At this time the frequency is determined as the estimated value $C_f(e)$. The estimated frequency, which is a value including error, is gradually reduced when the data stream is added. In other words, the errors (e) in connection with the n-itemset e that is firstly managed in the current data stream $D_k$ is $$\frac{\varepsilon(e)}{D_k}$$

and is converged to 0 as the data stream is progressed to be infinite.

If the estimated frequency $C_f(e)$ is equal to or more than the minimum $S_{min}$, the itemset e can be considered as the new maximal frequent itemset. However, since the estimated frequency is equal to or larger than the accurate frequency at any time, there may actually be a case of misjudging the itemsets, which are not the maximal frequent itemsets, as the maximal frequent itemsets. In this case, the subsets of the itemset e, which is the original maximal frequent itemset, are considered not to be the maximal frequent itemset, such that errors significantly occur in the result of the itemset. Therefore, in order for the itemset e to be maximal frequent, IS_MAX(e) is updated to TRUE only when the error having the corresponding itemset approaches the accurate frequency, such that it is preferable to minimize the case where the subsets of the maximal frequent itemset e are misjudged. To this end, the itemset can be updated to the maximal frequent itemset only when the error of the itemset is within the previously defined maximum error threshold $S_{err}$.

Figure 1:
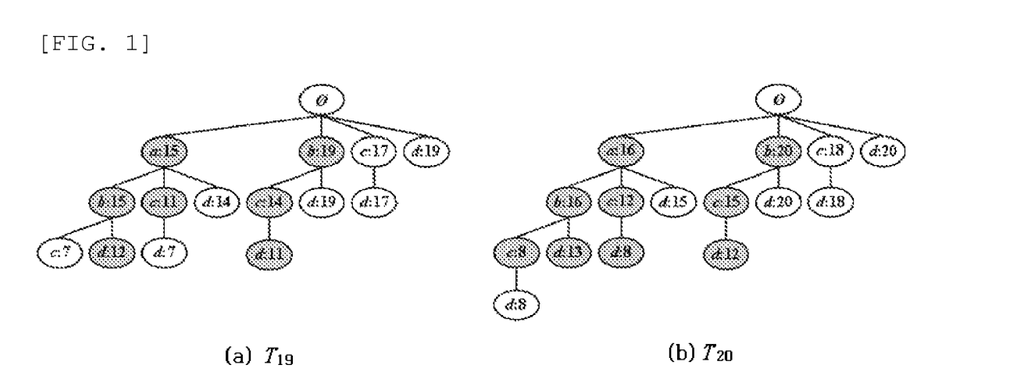
FIG. 1 shows one example of a structure of a prefix tree for finding maximal frequent itemsets according to one embodiment of the present invention.

FIG. 1 shows one example of the prefix tree structure for finding the maximal frequent itemsets according to one embodiment of the present. Herein, it is assumed that the minimum support $S_{min}=0.4$, the significant support $S_{sig}=0.25$, and the maximum error threshold $S_{err}=0.05$. The shaded nodes indicate that the IS_MAX is TRUE. FIG. 1 (A) shows a prefix tree in a case where 19 transactions are input and FIG. 1(B) shows a prefix tree in a case where $T_{20}=\{a,b,c,d\}$ as new transactions are input. When $T_{20}$ is input, the new itemset abcd is inserted as the prefix tree. At this time, since the estimated error of the itemset abcd s(abcd), which is (8−6)/20=0.1, is larger than the maximum error threshold 0.05, the IS_MAX(abcd) is not updated to TRUE. On the other hand, the itemsets whose error is within $S_{err}$ among the subsets of the itemset abcd is considered as the maximal frequent itemset, such that IS_MAX. The itemset abcd can be considered as the maximal frequent itemsets only after it is progressed up to the point in time $T_{40}$ when the error of the itemset is smaller than 0.05. As described above, the errors of the overall result sets can be minimized by delaying the determined point in time of the maximal frequent itemset up to the point in time when the error becomes sufficiently small.

The method for finding the maximal frequent itemsets over the data streams according to one embodiment of the present invention will now be described in more detail. The method according to the present embodiment finds the maximal frequent itemsets by applying the prefix tree and the error reducing scheme as described above. Also, the delay addition and the item trimming process are preformed as described in the estDec method.

The method according to the present embodiment updates the information on each node while sequentially visiting the items of $T_k$ existing in the prefix tree $P_k$ and the nodes corresponding to the itemsets when the new transactions $T_k$ are generated. The items of $T_k$ are aligned in a dictionary-like order and these items within the prefix tree structure are found in a depth first scheme. At this time, whether the corresponding itemsets are the transactional maximal frequent itemsets $T_k$-max are checked while finding the prefix tree, such that the address of the node, which is $T_k$-max, is stored. Since there are a very large number of $T_k$-max according to the data features, managing all the $T_k$-max may generate a large load. Therefore, as the top-L transactional maximal frequent itemsets are described, only the $T_k$-max included in the previously defined L rankings can be managed.

Figure 2:
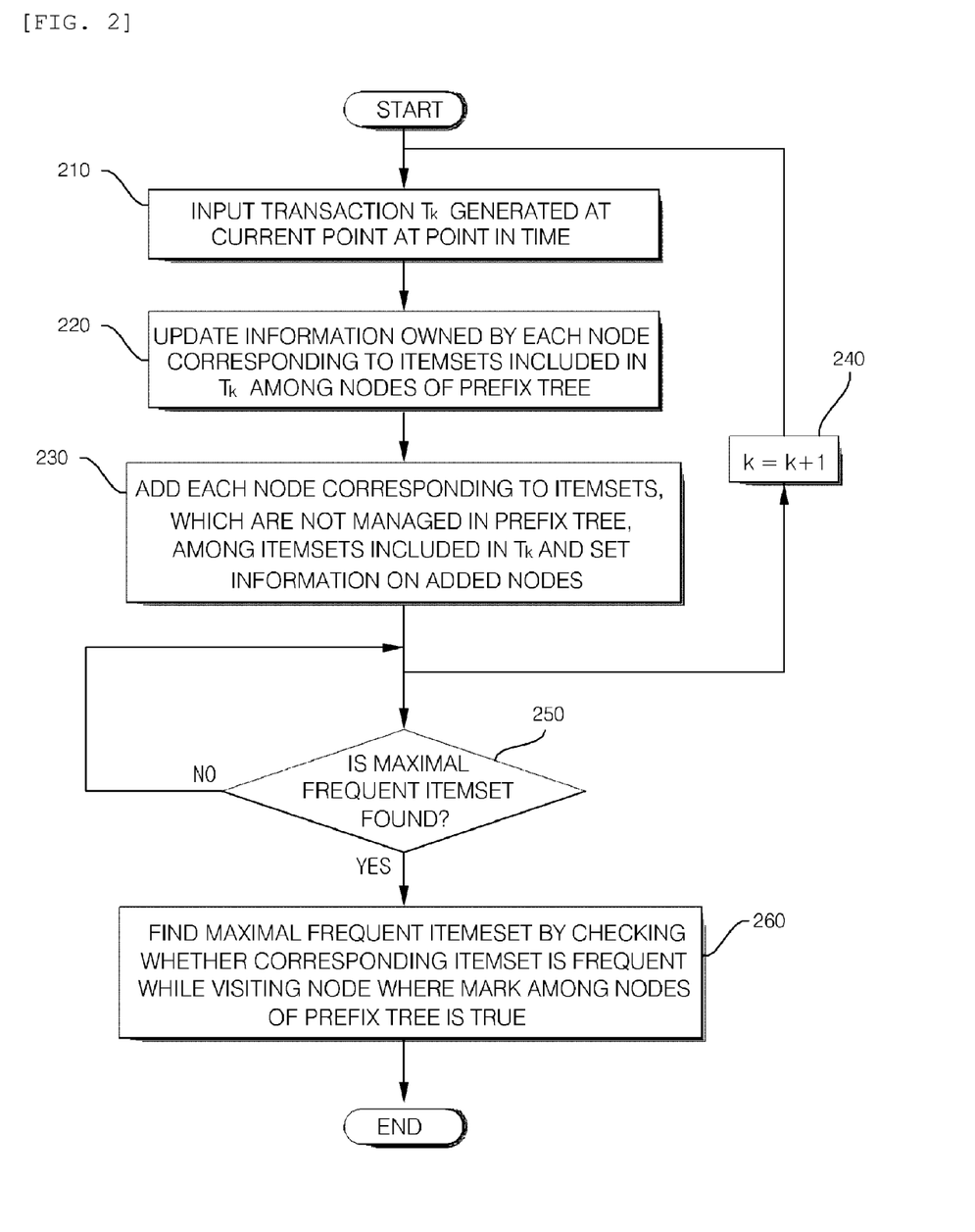
FIG. 2 is a flow chart of a method for finding maximal frequent itemsets over data streams according to one embodiment of the present invention.

FIG. 2 is a flow chart of the method for finding the maximal frequent itemsets over the data streams according to one embodiment of the present invention.

At step 210, the transaction $T_k$ generated in the current point in time is input. At this time, the total number of transactions $|D|_k$ is updated.

At step 220, the information having each node corresponding to the itemsets included in $T_k$ among the nodes of the prefix tree, such as appearance frequency, maximum lifetime, and IS_MAX, is updated. At this time, in the case where the appearance frequency of the nodes, which are not 1-level, among the nodes whose appearance frequency is updated is less than the significant support $S_{sig}$, the corresponding node is trimmed from the potential tree. The nodes whose maximum lifetime is updated from before the current point in time k to after the current point in time k are managed as the nodes corresponding to $T_k$-max. Also, the nodes whose support according to the appearance frequency is equal to or more than the minimum support $S_{min}$ is also managed as the nodes corresponding to $T_k$-max. Furthermore, when the maximum error generated in the process of estimating the support of $T_k$-max is within the maximum error threshold $S_{err}$, it can be considered as the maximal frequent itemsets to update IS_MAX to TRUE.

Figure 3:
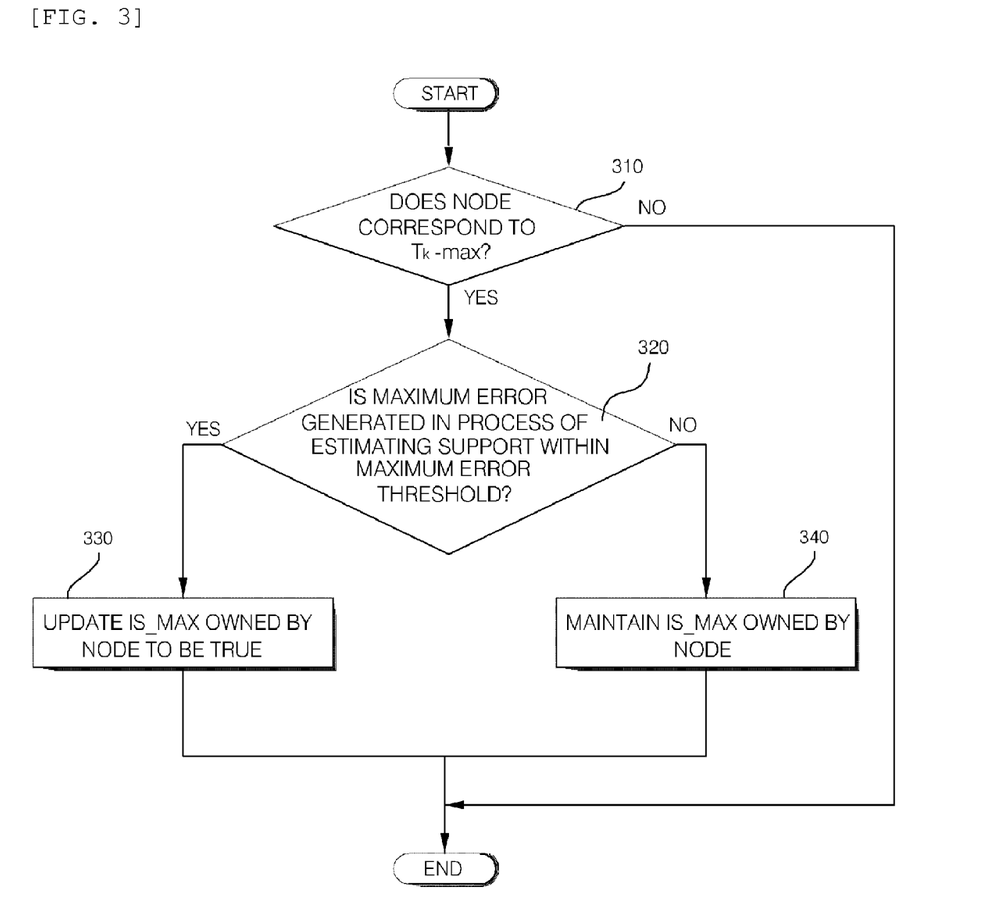
FIG. 3 is a flow chart for explaining in detail a step 220 shown in FIG. 2.

FIG. 3 is a flow chart for explaining in more detail step 220. Steps shown in FIG. 3 are performed on each node while visiting nodes corresponding to the itemsets included in $T_k$.

At step 310, it is judged whether the visited node is a node corresponding to $T_k$-max. If so, it proceeds to step 320 and if not, the process is not performed on the corresponding node. At this time, in connection with the judgment on whether the node corresponds to the $T_k$-max, as described above, the node whose maximum lifetime is updated from before the current point in time k to after the current point in time k or the node whose support according to the appearance frequency is equal to or more than the minimum support $S_{min}$ and not having children nodes corresponding to the itemsets appearing in the transaction $T_k$ are judged to be the node corresponding to Tk-max.

At step 320, it is judged whether the maximum error generated in the process of estimating the support of the itemset of the node corresponding to $T_k$-max is within the maximum error threshold. If so, it proceeds to step 330 to update IS_MAX owned by the corresponding node to TRUE. If not, it proceeds to step 340 to maintain IS_MAX owned by the corresponding node.

Figure 4:
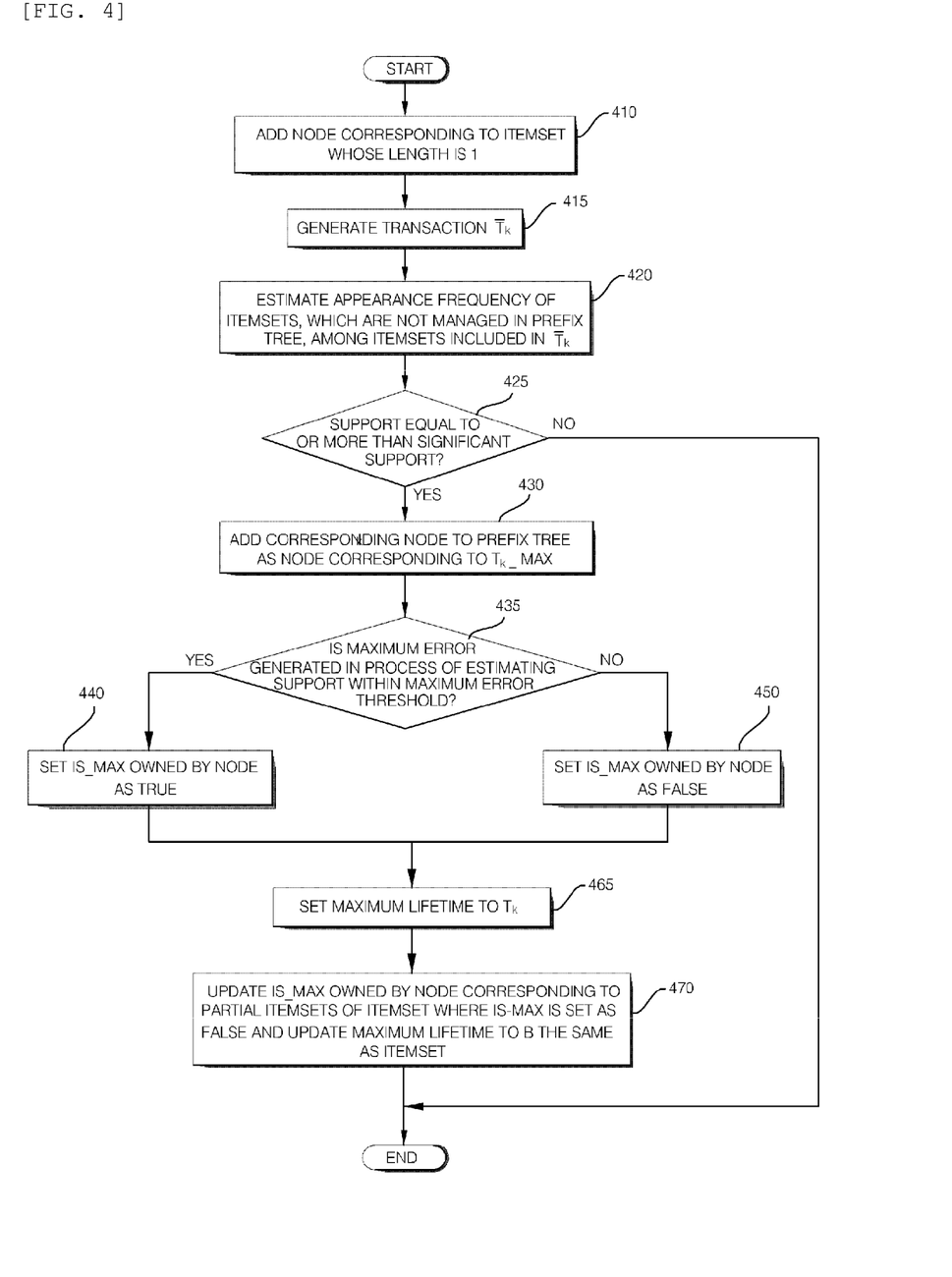
FIG. 4 is a flow chart for explaining in detail a step 230 shown in FIG. 2.

Referring back to FIG. 2, at step 230, each node corresponding to the itemsets, which are not managed in the prefix tree, among the itemsets included in the transaction $T_k$ is added to the prefix tree and the information on the added nodes, that is, the appearance frequency, the maximum lifetime, and IS_MAX are updated. FIG. 4 is a flow chart for explaining in more detail step 230.

Referring to FIG. 4, at step 410, the node corresponding to the itemset whose length is 1 is added to the prefix tree. The itemset whose length is 1 is added to a first level of the prefix tree without applying the estimation process of the appearance frequency. At this time, since the added 1-level node may be the newly generated maximal frequent itemset, it may be considered as $T_k$-max.

At step 415, since the itemset including an insignificant itemset is an insignificant itemset, the filtered transaction $T_k$ is generated by excluding items smaller than the significant support $S_{sig}$ among the items included in the transaction $T_k$.

Steps 420 to 465 to be described as shown in FIG. 4 targets the filtered transaction $T_k$ and are thus performed on the visited nodes by visiting the nodes corresponding to each itemset, which is equal to or more than 2 in length and is not managed in the prefix tree, among the itemsets included in $T_k$.

At step 420, the appearance frequency of the itemsets, which are not managed in the prefix tree, among the itemsets included in $T_k$ is estimated.

At step 425, it is judged that the estimated frequency $C_k^I(e)$ is equal to or larger than the significant support $S_{sig}$. If so, it proceeds to step 430 and if not, the process on the itemset is not performed.

At step 430, since it can be considered that the longest new itemset is founded at the current point in time, the node representing the corresponding itemset is added to the prefix tree as the node corresponding to the $T_k$-max.

At step 435, the maximum error generated in the process of estimating the support at step 420 is calculated and it is judged whether the maximum errors(e) is within the maximum error threshold $S_{err}$. If so, it can be considered to be the maximal frequent itemset and thus, it proceeds to step 440, such that IS_MAX owned by the corresponding node is set as TRUE and if not, it proceeds to step 450, such that IS_MAX owned by the corresponding node is set as FALSE.

At step 465, the maximum lifetime of the corresponding nod is set to $\lfloor C_k^I(e)/S_{min} \rfloor$.

At step 470, IS_MAX owned by the nodes corresponding to the partial itemsets of the itemset where IS_MAX at step 440 is set as TRUE is updated to FALSE and the maximum lifetime is updated to be the same as the itemset. On the other hand, since the nodes of the itemsets previously existing in the prefix tree receive a visit while each node receives a visit so as to perform steps 420 to 465, the maximum lifetime and IS_MAX of the visited nodes may be updated as described at step 470 whenever these nodes receives a visit.

Referring back to FIG. 2, in order to perform the above-mentioned steps 210 to 230 in connection with the newly generated transaction, k increases by 1 at step 240 and a new transaction is received by returning to step 210.

On the other hand, at step 250, when there is a request on whether or not the maximal frequent itemset is found, it proceeds to step 260.

At step 260, it is checked whether the corresponding itemsets are frequent while visiting the nodes of the prefix tree whose IS_MAX is TRUE, thereby finding the maximal frequent itemsets. In other words, when the support is equal to or more than the minimum support $S_{min}$ by comparing the support of the itemsets with the minimum support $S_{min}$, it is judged to be the maximal frequent itemsets. In this case, since the nodes, which are not considered as the maximal frequent itemsets, that is, the nodes whose IS_MAX is FALSE are not found, the time needed for finding the maximal frequent itemsets is remarkably reduced.

On the other hand, when merely finding the frequent itemsets, the prefix tree is sequentially found, such that when the support of the itemsets corresponding to each node is equal to or more than the minimum support $S_{min}$, it is judged to be the frequent itemsets.

Figure 5:
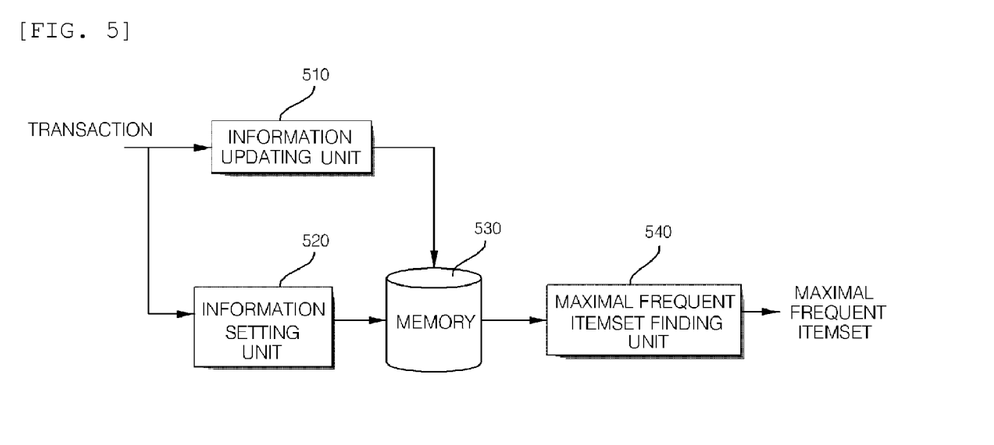
FIG. 5 is a block diagram of an apparatus for finding maximal frequent itemsets over data streams according to one embodiment of the present invention.

FIG. 5 is a block diagram of an apparatus finding the maximal frequent itemsets over the data streams according to one embodiment of the present invention.

A memory 530 stores the prefix tree, such that the itemsets included in the generated transactions and the appearance frequency of the itemsets are managed by using the prefix tree and each of the nodes of the prefix tree has the information, such as the appearance frequency of the itemsets corresponding to the nodes, the maximum lifetime ML, which is a maximum point in time, allowing the itemsets to remain in a frequent state even when no itemset appears later, the mark IS_MAX indicating whether or not the itemsets are the maximal frequent itemsets, etc. Herein, the prefix tree structure and the information owned by each node are the same as the foregoing description and therefore, the detailed description thereof will not be repeated.

An information updating unit 510 updates information owned by each node corresponding to the itemsets included in the transaction $T_k$ generated in the current point in time among the nodes of the prefix tree stored in the memory 530. The operation of the information updating unit 510 is the same as the contents described in step 220 shown in FIG. 2 and therefore, the detailed description thereof will not be repeated.

An information setting unit 520 adds each node corresponding to the itemsets, which are not managed in the prefix tree stored in the memory 530, among the itemsets included in the transaction $T_k$ to the prefix tree and sets the information on the added nodes. The operation of the information setting unit 520 is the same as the contents described in step 230 shown in FIG. 2 and therefore, the detailed description thereof will not be repeated.

A maximal frequent itemset finding unit 540 finds the maximal frequent itemsets by checking whether the corresponding itemsets are frequent while visiting the nodes indicating that the mark IS_MAX among the nodes of the prefix tree stored in the memory 530 is the maximal frequent itemsets and outputs the results. The operation of the maximal frequent itemset finding unit 540 is the same as the contents described in step 260 shown in FIG. 2 and therefore, the detailed description thereof will not be repeated.

According to the present invention as described above, in order to find the maximal frequent itemsets in the data stream environment, the prefix tree maintains the added information, such that the maximal frequent itemsets as well as the existing frequent itemsets can be found. Further, when the error in the estimated support of the itemsets within the prefix tree structure is within the predetermined threshold, the information owned by the corresponding nodes is updated, making it possible to maximize the mining results within the restricted memory space, that is, the accuracy in finding the maximal frequent itemsets and some nodes are found according to the mark indicating the maximal frequent itemsets or not without finding all the nodes so as to find the maximal frequent itemsets, making it possible to remarkably reduce time for finding the maximal frequent itemsets.

Meanwhile, the embodiments of the present invention as described above can be performed by a program that can be run in a computer and can be implemented in a general-purpose digital computer that runs the program using a recording medium readable by the computer. The recording medium readable by the computer may include a magnetic storage medium (for example, ROM, floppy disk, hard disk, etc.), an optical reading medium (for example, CD-ROM, DVD, etc.), and a storage medium, such as a carrier wave (for example, transmission over an internet).

The present invention is described on the basis of exemplary embodiments up to now.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A method for finding maximal frequent itemsets over data streams including continuously generated transactions, the method comprising:

when itemsets included in previously generated transactions and appearance frequencies of the itemsets are managed by a prefix tree and each of nodes of the prefix tree has information about an appearance frequency of an itemset corresponding to each node, a maximum lifetime which is a maximum point in time that allows the corresponding itemset to remain in a frequent state even if the corresponding itemset does not appear later, and a mark indicating whether the corresponding itemset is a maximal frequent itemset, (a) receiving transaction $T_k$ generated at a current point in time;

(b) updating the information owned by each node corresponding to the itemset of the transaction $T_k$ among the nodes of the prefix tree;

(c) adding each node, which is not managed in the prefix tree among nodes corresponding to the itemset of the transaction $T_k$, to the prefix tree, and setting the information on the added nodes; and (d) finding maximal frequent itemsets by visiting each node of the prefix tree which has the mark indicating the maximal frequent itemset, and checking whether the corresponding itemset is frequent;

wherein the step (b) allows the mark owned by the node corresponding to the maximal frequent itemset, which belongs to subsets of the itemset of the transaction $T_k$, among the nodes of the prefix tree, to indicate the maximal frequent itemset only when a maximum error generated in a process of estimating a support of the maximal frequent itemset is within a maximum error threshold, and wherein the node corresponding to the maximal frequent itemset is a node whose maximum lifetime is updated from before the current point in time k to after the current point in time k or a node not having children nodes corresponding to the itemset of the transaction $T_k$, whose support according to the appearance frequency is equal to or more than a minimum support having a predetermined value.

2. The method of claim 1, wherein the step (b) includes pruning each node of the prefix tree whose support of the corresponding itemset is smaller than a significant support having a predetermined value.

3. The method of claim 1, wherein, in adding each node to the prefix tree, the step (c) estimates the appearance frequency of the itemset of the transaction $T_k$ and adds each node whose support according to the estimated appearance frequency is equal to or larger than a significant support having a predetermined value, to the prefix tree.

4. The method of claim 3, wherein the step (c) includes:

(c1) in connection with a transaction $\bar{T}_k$ generated by excluding items having smaller support than the significant support among items included in the transaction $T_k$, estimating the appearance frequency of the itemsets, which are not managed in the prefix tree, among the itemsets included in the transaction $T_k$ and adding the corresponding nodes to the prefix tree when the support according to the estimated appearance frequency is equal to or more than the significant support; and (c2) when a maximum error generated in the step (c1) of the itemsets corresponding to the added nodes is within a maximum error threshold having a predetermined value, setting each mark of the added nodes so as to indicate the maximal frequent itemset and setting each maximum lifetime of the added nodes.

5. The method of claim 4, wherein the step (c) further includes updating each mark so as not to indicate the maximal frequent itemset in connection with the nodes corresponding to subsets of the itemset corresponding to the node whose mark is set so as to indicate the maximal frequent itemset at the step (c2) and updating the maximum lifetime.

6. The method of claim 1, wherein the step (b) updates each mark so as to indicate the maximal frequent itemset only for the predetermined number of nodes in the order of length of the corresponding itemsets among the nodes corresponding to the maximal frequent itemset.

7. A non-transitory recording medium readable by a computer recording a program for running a method for finding maximal frequent itemsets over data streams, the method comprising:

when itemsets included in previously generated transactions and appearance frequencies of the itemsets are managed by a prefix tree and each of nodes of the prefix tree has information about an appearance frequency of an itemset corresponding to each node, a maximum lifetime which is a maximum point in time that allows the corresponding itemset to remain in a frequent state even if the corresponding itemset does not appear later, and a mark indicating whether the corresponding itemset is a maximal frequent itemset, (a) receiving transaction $T_k$ generated at a current point in time;

(b) updating the information owned by each node corresponding to the itemset of the transaction $T_k$ among the nodes of the prefix tree;

(c) adding each node, which is not managed in the prefix tree among nodes corresponding to the itemset of the transaction $T_k$, to the prefix tree, and setting the information on the added nodes; and (d) finding maximal frequent itemsets by visiting each node of the prefix tree which has the mark indicating the maximal frequent itemset, and checking whether the corresponding itemset is frequent, wherein the step (b) allows the mark owned by the node corresponding to the maximal frequent itemset, which belongs to subsets of the itemset of the transaction $T_k$, among the nodes of the prefix tree, to indicate the maximal frequent itemset only when a maximum error generated in a process of estimating a support of the maximal frequent itemset is within a maximum error threshold, and wherein the node corresponding to the maximal frequent itemset is a node whose maximum lifetime is updated from before the current point in time k to after the current point in time k or a node not having children nodes corresponding to the itemset of the transaction $T_k$, whose support according to the appearance frequency is equal to or more than a minimum support having a predetermined value.

8. An apparatus for finding maximal frequent itemsets over data streams including continuously generated transactions including:

a memory for storing a prefix tree which manages itemsets included in previously generated transactions and appearance frequencies of the itemsets, wherein each of nodes of the prefix tree has information about an appearance frequency of an itemset corresponding to each node, a maximum lifetime which is a maximum point in time that allows the corresponding itemset to remain in a frequent state even if the corresponding itemset does not appear later, and a mark indicating whether the corresponding itemset is a maximal frequent itemset;

an information updating unit configured to update the information owned by each node corresponding to an itemset of a transaction $T_k$ generated at a current point in time among the nodes of the prefix tree;

an information setting unit configured to add each node which is not managed in the prefix tree among nodes corresponding to the itemset of the transaction $T_k$, to the prefix tree, and to set the information on the added nodes; and a maximal frequent itemsets finding unit configured to find maximal frequent itemsets by visiting each node of the prefix tree which has the mark indicating the maximal frequent itemset and to check whether the corresponding itemset is frequent, wherein the information updating unit allows the mark owned by the node corresponding to the maximal frequent itemset, which belongs to subsets of the itemset of the transaction $T_k$, among the nodes of the prefix tree, to indicate the maximal frequent itemset only when a maximum error generated in a process of estimating a support of the maximal frequent itemset is within a maximum error threshold, and wherein the node corresponding to the maximal frequent itemset is a node whose maximum lifetime is updated from before the current point in time k to after the current point in time k or a node not having children nodes corresponding to the itemset of the transaction $T_k$, whose support according to the appearance frequency is equal to or more than a minimum support having a predetermined value.

9. The apparatus of claim 8, wherein the information updating unit is configured to prune each node of the prefix tree whose support of the corresponding itemset is smaller than a significant support having a predetermined value.

10. The apparatus of claim 8, wherein the information setting unit is configured to estimate the appearance frequency of the itemset of the transaction $T_k$ and to add each node whose support according to the estimated appearance frequency is equal to or larger than a significant support having a predetermined value, to the prefix tree.

11. The apparatus of claim 10, wherein the information setting unit estimates the appearance frequency of the itemsets, which are not managed in the prefix tree, among the itemsets included in a transaction $T_k$ which is generated by excluding items having smaller support than the significant support among items included in the transaction $T_k$, and adds the corresponding nodes to the prefix tree when the support according to the estimated appearance frequency is equal to or more than the significant support, when a maximum error generated at time of estimating the appearance frequency of the itemsets corresponding to the added nodes is within a maximum error threshold having a predetermined value, and sets each mark of the added nodes so as to indicate the maximal frequent itemset and setting each maximum lifetime of the added.

12. The apparatus of claim 11, wherein the information setting unit updates each mark so as not to indicate the maximal frequent itemset in connection with the nodes corresponding to subsets of the itemset corresponding to the node whose mark is set so as to indicate the maximal frequent itemset and updates the maximum lifetime.

13. The apparatus of claim 8, wherein the information updating unit updates each mark so as to indicate the maximal frequent itemset only for the predetermined number of nodes in the order of length of the corresponding itemsets among the nodes corresponding to the maximal frequent itemsets $T_k$-max.

* * * * *

UNITED STATES PATENT AND TRADEMARK OFFICE
CERTIFICATE OF CORRECTION

| | | |
|---|---|---|
| PATENT NO. | : 8,150,873 B2 | Page 1 of 1 |
| APPLICATION NO. | : 12/258645 | |
| DATED | : April 3, 2012 | |
| INVENTOR(S) | : Lee | |

It is certified that error appears in the above-identified patent and that said Letters Patent is hereby corrected as shown below:

Title Page, Item (75) Inventor: "Wong Suk Lee" should read --Won Suk Lee--.

Signed and Sealed this
Ninth Day of October, 2012

David J. Kappos
*Director of the United States Patent and Trademark Office*